United States Patent
Lee et al.

(10) Patent No.: US 6,825,952 B1
(45) Date of Patent: *Nov. 30, 2004

(54) PRINTER CALIBRATION SCHEME

(75) Inventors: Ho Chong Lee, Endicott, NY (US); Mikel J. Stanich, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/100,487

(22) Filed: Jun. 19, 1998

(51) Int. Cl.[7] .............................................. G06K 15/00
(52) U.S. Cl. ..................... 358/1.9; 358/3.06; 358/504
(58) Field of Search ................................ 358/1.9, 1.13, 358/1.14, 1.15, 3.06, 501–504, 518; 382/237, 288, 167

(56) References Cited

U.S. PATENT DOCUMENTS

| | | | | |
|---|---|---|---|---|
| 5,185,673 A | * | 2/1993 | Sobol | 358/296 |
| 5,675,716 A | * | 10/1997 | Shu | 358/1.9 |
| 5,731,823 A | * | 3/1998 | Miller et al. | 347/5 |
| 5,805,734 A | * | 9/1998 | Ebner | 382/237 |
| 6,044,173 A | * | 3/2000 | Kumada | 382/167 |
| 6,055,065 A | * | 4/2000 | Rao et al. | 358/1.9 |
| 6,057,929 A | * | 5/2000 | Walker | 358/1.15 |
| 6,108,008 A | * | 8/2000 | Ohta | 345/431 |

* cited by examiner

Primary Examiner—Gabriel Garcia
(74) Attorney, Agent, or Firm—Gates & Cooper LLP

(57) ABSTRACT

A system for configuring a first printer according to the grayscale printing characteristics of a second printer is described. Grayscale printing characteristics of a first and a second printer are characterized, and a transform between the grayscale printing characteristics of the first printer and the grayscale printing characteristics of the second printer is generated. This transform is used to modify the first printer grayscale commands so as to emulate the grayscale printing characteristics of the second printer.

37 Claims, 6 Drawing Sheets

| 27 | 19 | 14 | 7 | 8 | 15 | 20 | 28 |
|----|----|----|---|---|----|----|----|
| 32 | 26 | 6 | 1 | 2 | 9 | 21 | 29 |
| 31 | 25 | 5 | 4 | 3 | 10 | 22 | 30 |
| 24 | 18 | 13 | 12 | 11 | 16 | 17 | 23 |

|  |  |  | 204 |  | 206 |  |  | 208 |
|---|---|---|---|---|---|---|---|---|
| 47 | 109 | 147 | 202 | 194 | 140 | 101 | 39 | |
| 8 | 54 | 210 | 248 | 240 | 186 | 93 | 31 | |
| 16 | 62 | 217 | 225 | 233 | 178 | 85 | 23 | |
| 70 | 116 | 155 | 163 | 171 | 132 | 124 | 78 | |

FIG. 2B

| 47 | 109 | 147 | 202 | 194 | 140 | 101 | 39 |  |  |  |  |  |  |  |  |
|---|---|---|---|---|---|---|---|---|---|---|---|---|---|---|---|
| 8 | 54 | 210 | 248 | 240 | 186 | 93 | 31 |  |  |  |  |  |  |  |  |
| 16 | 62 | 217 | 225 | 233 | 178 | 85 | 23 |  |  |  |  |  |  |  |  |
| 70 | 116 | 155 | 163 | 171 | 132 | 124 | 78 |  |  |  |  |  |  |  |  |
| 47 | 109 | 147 | 202 | 194 | 140 | 101 | 39 | 47 | 109 | 147 | 202 | 194 | 140 | 101 | 39 |
| 8 | 54 | 210 | 248 | 240 | 186 | 93 | 31 | 8 | 54 | 210 | 248 | 240 | 186 | 93 | 31 |
| 16 | 62 | 217 | 225 | 233 | 178 | 85 | 23 | 16 | 62 | 217 | 225 | 233 | 178 | 85 | 23 |
| 70 | 116 | 155 | 163 | 171 | 132 | 124 | 78 | 70 | 116 | 155 | 163 | 171 | 132 | 124 | 78 |

FIG. 2C

PRINTER CALIBRATION SCHEME

CROSS-REFERENCE TO RELATED APPLICATIONS

This application is related to the following co-pending and commonly-assigned applications, all of which are incorporated by reference herein:

Application Ser. No. 09/100,055, filed on same date herewith, by Ho Chong Lee, Mikel J. Stanich, and Jack L. Zable, entitled "Half-tone Screen Calibrations," and Application Ser. No. 09/100,915, filed on same date herewith, by Nenad Rijavec, entitled "Calibrating Digital Halftoning Algorithms with Multiple Personalities".

BACKGROUND OF THE INVENTION

1. Field of the Invention

The present invention relates to network printing systems, and in particular, to a method and apparatus for performing digital half-tone screen calibrations.

2. Description of the Related Art

Network printing systems generally comprise an assemblage of different printers, client computers, servers, and other components connected over a network. A print job is assembled at a client computer and transmitted over the network to a server linked to a variety of printers. Although these printers have historically been used to reproduce text, they are increasingly being used to reproduce graphic and image files, which have significant grayscale content.

Digital printers with grayscale reproduction capabilities use half tone screens with or without dot density control (contone) to reproduce the grayscales. Due to differences in dot gain characteristics, types of screens, and contone designs, grayscale characteristics can vary widely from printer to printer. Consequently, when graphic and image files generated for particular grayscale characteristics are sent to a printer with different characteristics, the appearance of the printed output may be substantially different. Such variations are more pronounced among bi-level printers, because dots are not as easily controlled as they are with contone printers.

These variations often result in visually unacceptable results, because proper rendering of grayscale information is critical to the reproduction of graphical and image files. This problem can be avoided by imposing a print job routing scheme that associates particular graphical and image files with a particular printer in the network, but that requires storage, enforcement, and management of these associations, and is antithetical to the flexible and distributed nature of a network computing system. Also, by confining the printing of a grayscale image to a particular printer, this approach would not allow an individual to adjust the image quality of a desired print on a local printer before transferring the print file to a higher quality or higher capacity printer for the final product. There is therefore a need for a system that allows consistent grayscale printing among a variety of printers in a network, each with different grayscale printing characteristics.

SUMMARY OF THE INVENTION

To address the requirements described above, the present invention discloses a method, apparatus, and article of manufacture for the calibration of a halftone screen of a first printer to simulate the grayscale characteristics of second printer. The method comprises the steps of characterizing the grayscale printing characteristics of the first and the second printer and generating a transform between the grayscale printing characteristics of the first printer and the grayscale printing characteristics of the second printer. In one embodiment, the characteristics of the first and the second printer are generated by printing patches of gray levels with the first and the second printer, with each gray level corresponding to a gray level input command, measuring the printed gray level of the patches, normalizing and smoothing the gray level measurements, and defining functions which characterize the relationship between the printed gray level and the gray level input command. These functions are used to derive a transform which can be used to configure the first printer to emulate the grayscale printing characteristics of the second printer. The apparatus comprises a first and a second printer for printing grayscales, a measurement means such as a reflectometer or densitometer to measure the printed grayscales, and means, such as a processor, for determining a transform between the grayscale printing characteristics of the first printer and the second printer. In this context, the "second printer" may not be a physical device, but instead represent an ideal or desired printer with known characteristics.

BRIEF DESCRIPTION OF THE DRAWINGS

Referring now to the drawings in which like reference numbers represent corresponding parts throughout:

FIG. 1 is a diagram illustrating an exemplary hardware environment for a network printing system;

FIGS. 2A–2C are diagrams showing an example of a tiled rectangular threshold matrix and its operation;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figures 1, 2A:
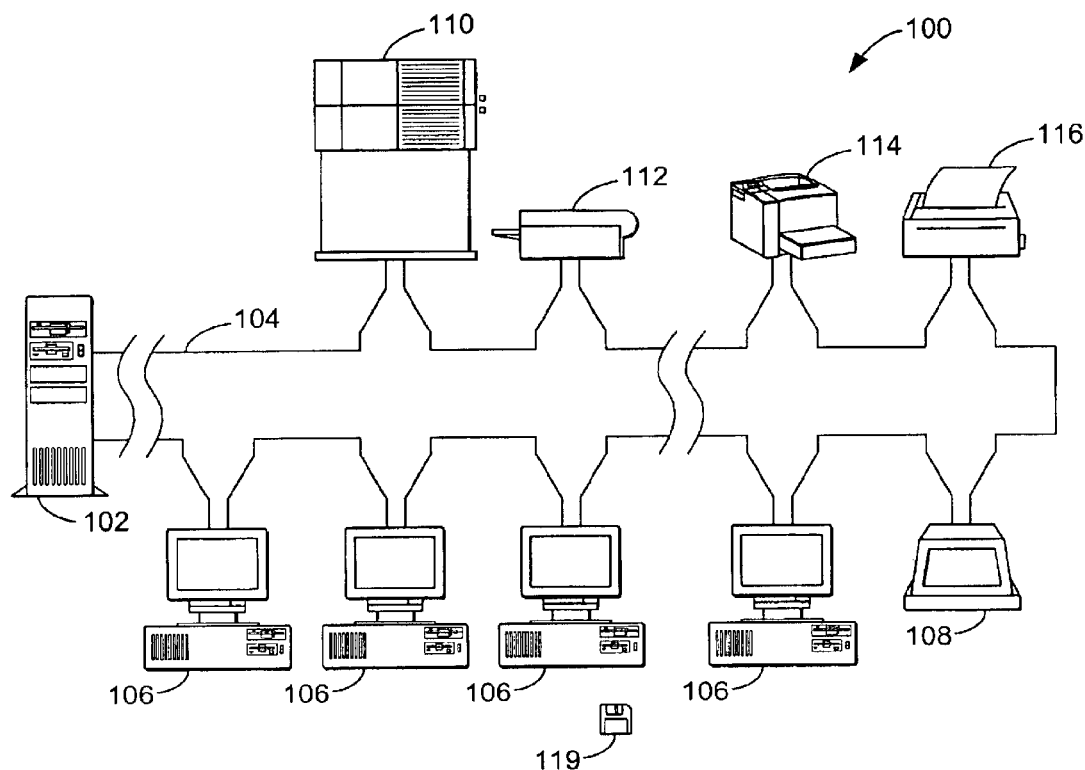

FIG. 1 is a diagram of an exemplary embodiment of a network printing system 100 adapted to implement the present invention. The network printing system 100 comprises a plurality of client components including a server 102, one or more desktop computers 106 and/or laptop computers 108, operatively coupled to a server 102 via network connectivity (e.g. token-ring, LAN, Ethernet, WAN, TCP/IP) 104. In the preferred embodiment, computers 106, 108 comprise personal computers under the control of an operating system, such as the WINDOWS operating system. However, computers 106, 108 could comprise any type of computer such as a workstation, mainframe, etc, and the operating system could comprise any operating system, including OS/2®, OS/390™, MVS, VM, AIX®; MACINTOSH®, MACINTOSH OS®, and UNIX®.

Computers 106, 108 include an input device (e.g., keyboard, mouse pointing device, voice activated input device, touch sensitive display, etc.), monitor (e.g., CRT, LCD displays, etc.), as well as a data communication device (e.g. modem, network interface, etc.) to interface with the network 104. A computer-readable medium such as floppy disk 119 tangibly embodies data or instructions for program steps performed by computers 106 and 108. The network printing system 100 also comprises one or more printer devices, including a high speed printer 110, a first printer 112, a second printer 114, and dot matrix printer 116.

Process

The general process for printing an image on one of the network printers 110–116 will now be described. Data representing an image comprised of grayscale level print commands is provided to the server 102 via the network connectivity 104. A print manager implemented in the server 102 applies a base transfer function to the grayscale input values. This base transfer function modifies the grayscale input values to account for printer dot gain and other printer non-linearities. Next, the print manager performs a halftoning process on the modified input values and creates a rasterized version of the image, which includes a bi-level input for each of the PELs (Picture ELements) in the print device. The rasterized version of the image is eventually transmitted to the printers 110–116.

Although the scaling, transfer function, and halftoning processes are described as being performed in the computers 106, 108 or the server 102, the invention may be advantageously practiced in other embodiments. For example, the base transfer function and/or halftoning process may be implemented in the printers 110–116 as well, as these devices often have a resident central processing unit (CPU) and memory with sufficient capability.

The rasterized version of the image is created using a process known as digital halftoning to simulate tone (darkness) variations with printed dots. Digital Halftoning simulates tone variations by varying the number and location of PELs to be activated within the printed area. Digital halftoning methods include clustered dot digital halftoning and dispersed dot digital halftoning. With clustered dot digital halftoning, dots are formed by multiple PELs, and are located on a regular grid, with one dot per halftone cell. With dispersed dot digital halftoning, dots are not located on a regular grid and appear as random dots. Dispersed dot digital halftoning requires high resolution, and a printer with the ability to print a single dot.

FIG. 2A is a diagram showing the turn-on order for a halftone cell 200. The numbers shown are the order in which the PELs are blackened to achieve various gray levels. The halftone cell 200 comprises an array of PELs 202 used to render a screen dot, and are a basic building block of clustered dot ordered dithered halftones. The shape of the halftone cell is selected to permit tiling across the printed image. Representative shapes include rectangular, diamond, and hexagonal shapes.

FIG. 2B is a diagram illustrating how dots are rendered using the threshold matrix 208. Each PEL 202 is blackened when the threshold value exceeds the value of the gray level command for that PEL. As the grayscale command increases from pure white to black, additional PELs will be blackened and as the rendered image becomes darker and darker, and the apparent size of the dot rendered by the threshold matrix 208 will increase. The selection of threshold values and their position in the matrix determines the shape and size of the halftoning dots. As illustrated in FIG. 2B, when the threshold value associated with a PEL 204(248) exceeds the gray level for PEL 204, a first PEL 204 is blackened, rendering a small dot with the halftone cell. When a grayscale command is received, and the threshold value associated with PEL 206 (24) exceeds the gray level value for the second PEL 206, the second PEL 206 is blackened, thereby rendering a larger dot within the halftone cell. Since the surrounding PELs have not been blackened, the result is one black dot in each halftone cell surrounded by white area from the inactive PELs. When a number of the halftone cells are viewed from a distance they collectively render the desired contone image. Typically, the threshold values in the halftone cell are made up of equally spaced (incremented) values, producing a stair-stepped linear relationship between the rendered gray and the gray level of the image.

FIG. 2C is a diagram showing how the halftone cell threshold matrices 208 are aggregated or tiled together to cover the entire image to be printed. Rectangular halftone cells 208 are typically tiled together in a "bricklayed" arrangement as shown.

As described above, the impact of printer non-linearities such as dot gain, screen type (from the halftone cell implementation), and other factors cause substantial variation between the commanded graylevel print value and the resulting gray print level. The base transfer function described above can account for these factors, if the printer has this capability, by scaling commanded grayscale print levels up or down to a command value required to print the desired graylevel on the printer.

Suppose for example, that a user desires to print many copies of a document with contone image. To assure that the printed output is of sufficient quality, the user will print the image and text on a first (and generally local) printer, and examine the results. If necessary, printing factors such as the density can be adjusted by the user on a trial and error basis until the proper result is achieved. Next, to obtain a large number of copies or a higher quality copy, the user transmits the file to be printed (whether by Internet e-mail, intranet, or by merely delivering a floppy) to second printer elsewhere in the network or to a third party vendor. Because the second printer has a different dot gain characteristics, the printed output from the second printer may bear little resemblance to the image printed at the local printer. The present invention ameliorates this problem by accounting for printer-to-printer variations in dot gain, and other factors.

Figure 3:
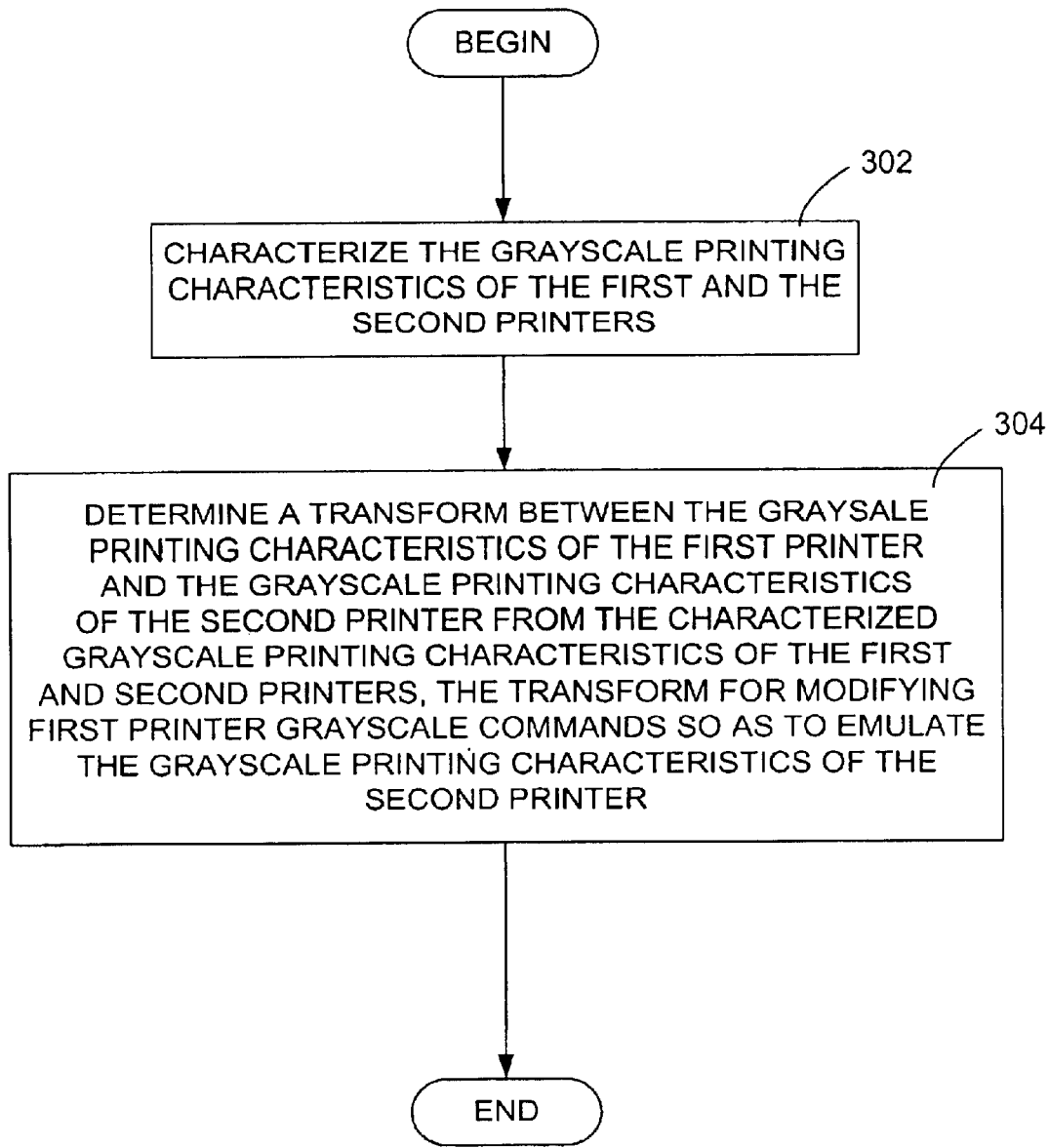
FIG. 3 is a flow chart describing the general operations used in one embodiment of the present invention.

FIG. 3 is a flow chart describing the operations performed in practicing one embodiment of the present invention. First, the grayscale printing characteristics of the first printer 112 and a second printer 114 are characterized. This is illustrated in block 302. To obtain accurate grayscale characteristics, multiple samples are made and patch measurements are averaged. Then, a transform between the grayscale printing characteristics of the first printer 112 and the grayscale printing characteristics of the second printer 114 is determined, as shown in block 304. This is accomplished using the characterized printing characteristics obtained from block 302. This transform is used to create a lookup table as required to transform the first printer 112 commands into those which will result in the desired grayscale levels.

Figure 4:
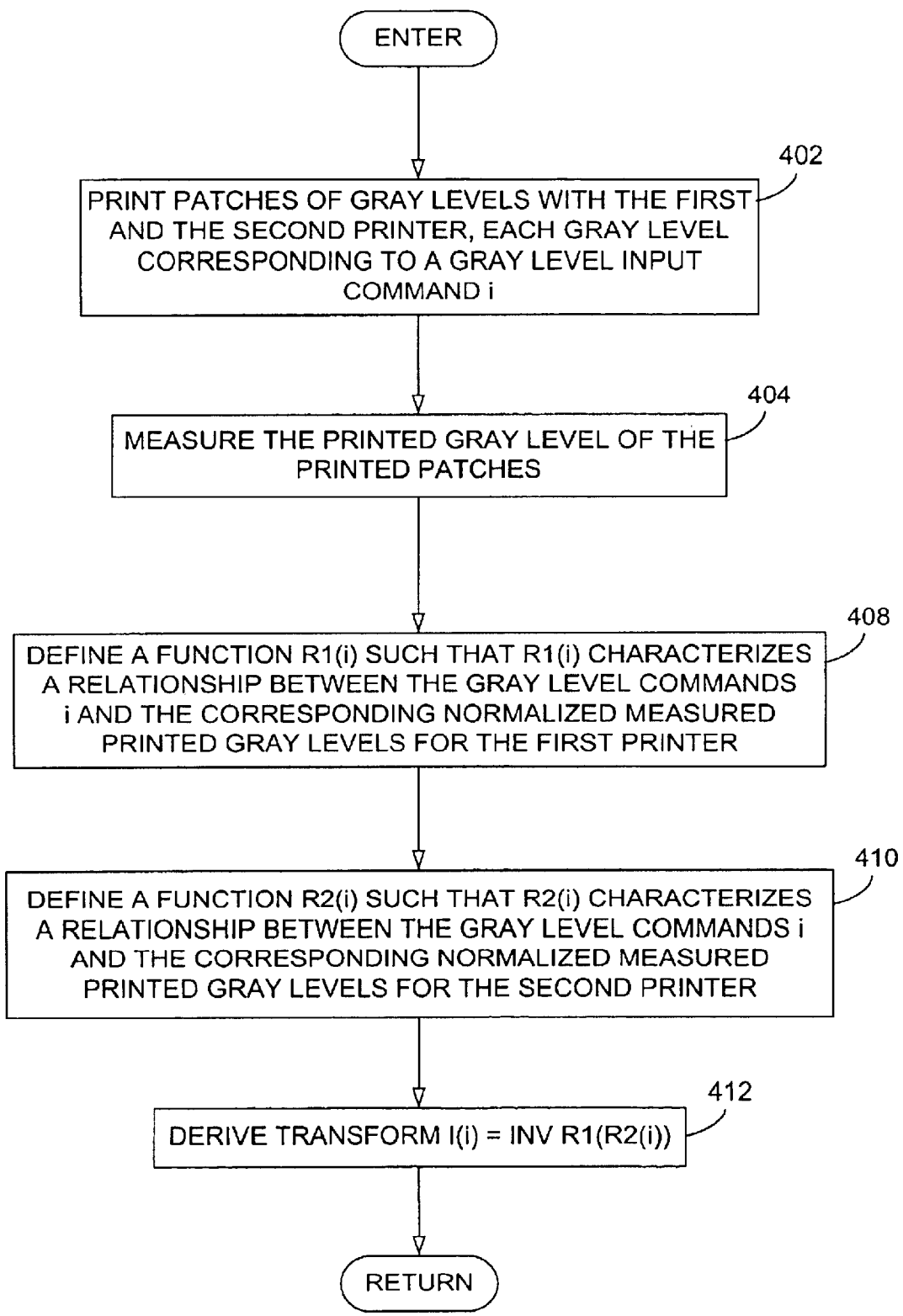
FIG. 4 is a flow chart of the operations used to characterize the grayscale printing characteristics of the first and the second printers.

FIG. 4 is a flow chart more specifically illustrating the operations performed in characterizing the grayscale printing characteristics of the first printer 112. First, patches of gray levels are printed with the first printer 112 and the second printer 114. This is accomplished by providing the printers with gray level input values i =0, 1, 2, . . . N and N is the largest gray level renderable by the printer. For clarity, further discussion will assume that the gray level input is i where i =0, 1, 2, . . . 255 and that a halftone screen with a known or given turn on sequence is utilized to render the grayscale patches. This means that 256 patches will be printed from black at i =0 to white at i =255.

Next, as shown in block 404, the printed gray level of each printed patch is measured. This can be accomplished in several ways. For example, the reflectivity of the printed patch can be measured with a scanner or similar device, or the density of the printed patch can be measured with a densitometer. A single measurement for each patch may be used, or to reduce errors and increase measurement accuracy, several measurements may be taken of each gray level on various pages and various printers of a given type, and the results averaged or otherwise processed to arrive at an improved measurement estimate. Averaging can minimize the effect of measurement and printer variations.

Figure 5:
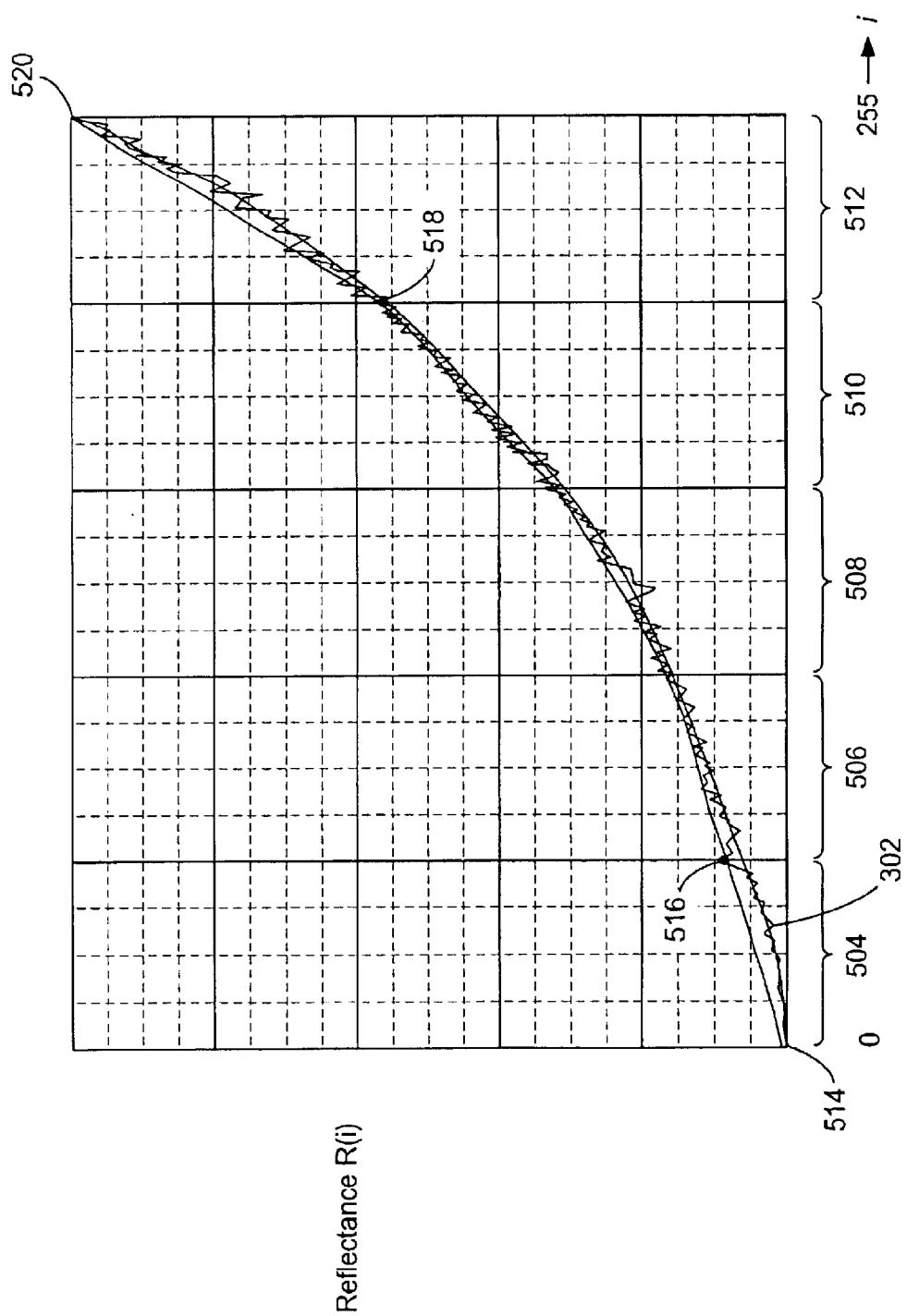
FIG. 5 is a representative plot of measured reflectivity values.

FIG. 5 presents a representative plot of measured reflectivity values 502 for one printer. The data may not increase monotonically with increasing graylevel command i because of measurement errors, printer variations, and the halftone design. The data between these points may be highly zig-zagged as shown in FIG. 5. The data may also have a staircase appearance due to the limited number of gray levels of the halftone design.

Referring back to FIG. 4, the measurement data is used to define a normalized function $R_1(i)$ such that $R_1(i)$ characterizes the normalized relationship between the graylevel commands i and the corresponding measured printed gray levels for the first printer 112. Similarly, measurement data from the second printer 114 is used to define a normalized function $R_2(i)$ such that $R_2(i)$ characterizes the normalized relationship between the graylevel commands i and the corresponding measured gray levels for the second printer 114. This is illustrated in blocks 408 and 410, respectively.

The method to define $R_1(i)$ and $R_2(i)$ by piecewise linear curves is graphically depicted in FIG. 5. Here, the input graylevel range is divided into a number of intervals 504–512 in which the measured data $R_1(i)_m$ and $R_2(i)_m$ is represented by straight lines with positive slopes. To assure a positive slope with the zig-zagged data previously described, the interval size can be adjusted upwards or downwards as required. The number of intervals is arbitrary, but usually sections are made at natural breakpoints such as sharp bends or the endpoints of the staircase. Starting from the origin 514 and the first segment or interval 504, the first portion of the curve is curve-fitted to a line passing through the origin 514 and terminated at the beginning of the second interval 506. The curve-fitted line joins at the end point of the first interval 516 and extends to the start of the next interval. This process is continued for all intervals. For the last interval 512, the curve fitted line joins at the end-point of the preceding interval 518 and the last point 520.

The foregoing steps generate a grayscale profile curve in piecewise linear functions. Assuming N segments are used in the piecewise representation, for the $m^{th}$ piecewise linear section or interval $$R_{1c}(i)=R_{1c}(n)+(i-n)P_{1m},$$

where $$n = \sum_{j=1}^{m-1} \Delta_j \text{ for } m > 1$$

and $$n=\phi \text{ form}=1$$

where $R_{1c}(i)$ is the curve fitted reflectance value at index i; n is the value at the beginning of an interval; $P_{1m}$ is the derived slope of the interval segment; and each section has interval size $\Delta_j$.

A normalized function $R_1(i)$ is computed from the values of the curve fitted function $R_{1c}(i)$ as:

$$R_1(i)=(R_{1c}(i)-R_{1c}(0))/R_{1c}(255)-R_{1c}(0))$$

and similarly, $R_2(i)$ is computed from the function $R_{2c}(i)$

For 256 equally-spaced grayscale inputs i =0, 1, 2, . . . 255, the above equation provides 256 printer outputs $R_1(i)$, i=0, 1, 2, . . . 255. In such a case, 256 patches may be printed, measured, and curve fitted as described above. The curve fitted function is then normalized to range from 0 to 1. Other curve fitting schemes can also be used. For example, the measured data can be fit to a power curve of the form $y=ax^b$ or by using splines. In some cases, the selection of a non-linear curve-fitting algorithm relieves the need to separate the input gray range into intervals. However, segmenting the input gray range into intervals is still an effective technique in cases where a precise match at a particular graylevel is desired, since a near perfect match to measured data may be obtained at these nodes like point 518.

As depicted in block 410 of FIG. 4, the foregoing operations are also used to determine the function $R_2(i)$ such that $R_2(i)$ characterizes the normalized relationship between the measured printed patch graylevels. $R_2(i)$ may also represent an ideal printer response, in which case $R_2(i)$ is already known, e.g. $R_2(i)=(i/255)$. Although not necessary, if piecewise linear curve fitting techniques are used, it is advisable to select the same increments for this process as were selected to determine $R_1(i)$. It is worthy to note that using the foregoing steps, the halftone threshold matrix and line screen frequency of the target (second) printer 114 need not match those of the base (first) printer 112.

Next, as described in block 412 of FIG. 4, a transform I(i) is defined such that:

$$I(i)=R^{-1}_1 R_{2(i)}$$

where $R_1^{-1}(i)$ is the inverse function of $R_1(i)$. Since I(i) may be a non-integer, discrete values for I(i) may be rounded to the nearest integer.

All that remains is to implement the transform I(i) such that input grayscale commands are modified to effect or emulate the grayscale printing characteristics of the second printer 114. This can be accomplished by forming a look up table, or other mapping from the uncorrected commands to the corrected commands. The lookup table can be included in a POSTSCRIPT® transfer function to accomplish the transfer.

Figure 6:
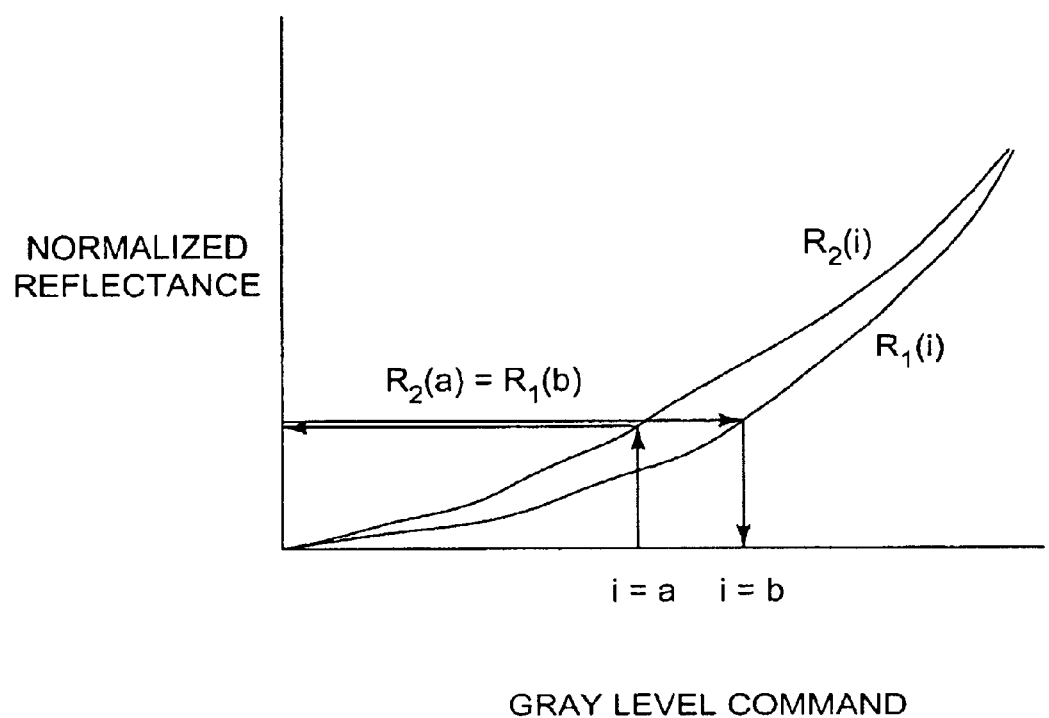
FIG. 6 is a graph visually depicting the relationships between the measured printer characteristics.

FIG. 6 is a graph visually depicting the relationships between the first printer 112 measured characteristic $R_1(i)$, the second printer 114 measured characteristic $R_2(i)$, and the transformation I(i). Grayscale command i=a is the graylevel of the second printer 114 which produces reflectance $R_2(a)$, and i=b is the graylevel of the first printer 112 which produces $R_1(b)$. Requiring $R_1(b) = R_2(a)$ forms the sets of points for the transform $I(i)$ by using values of a and b over the gray level range. In this case, $I(a)=b$.

Conclusion

This concludes the description of the preferred embodiments of the present invention. In summary, the present invention describes a method, apparatus, and article of manufacture for configuring a first printer to print according to the grayscale printing characteristics of a second printer. The method comprises the steps of characterizing the grayscale printing characteristics of the first and the second printer and generating a transform between the grayscale printing characteristics of the first printer and the grayscale printing characteristics of the second printer. In one embodiment, the characteristics of the first and the second printer are generated by printing patches of gray levels with the first and the second printer, with each gray level corresponding to a gray level input command i, measuring the printed gray level of the patches, and defining normalized and smoothed functions which characterize the relationship between the printed gray level and the gray level input command. These functions are used to derive a transform which can be used to map the gray levels of the first printer to resemble or emulate the grayscale printing characteristics of the second printer. The apparatus comprises a first and a second printer for printing grayscales, a measurement means such as a scanner or reflectometer or densitometer to measure the printed grayscales, and means, such as a processor, for determining a transform between the grayscale printing characteristics of the first printer and the second printer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of configuring a first printer to emulate grayscale printing characteristics of a second printer, comprising the steps of:
   characterizing the grayscale printing characteristics of the first printer and the second printer; and
   determining a transform between the grayscale printing characteristics of the first printer and the grayscale printing characteristics of the second printer using the characterized grayscale printing characteristics of the first printer and the second printer, the transform for modifying first printer grayscale commands so as to emulate the grayscale printing characteristics of the second printer.

2. The method of claim 1, further comprising the step of storing the transform between the grayscale printing characteristics of the first printer and the grayscale printing characteristics of the second printer as a look up table.

3. The method of claim 1, wherein:
   the step of characterizing the grayscale printing characteristics of the first printer and the second printer comprises the steps of:

printing patches of gray levels with the first printer and the second printer, each gray level patch corresponding to a gray level input command i;
   measuring the printed gray level of the printed patches;
   determining a normalized function $R_1(i)$ and a normalized function $R_2(i)$ such that $R_1(i)$ characterizes a relationship between the gray level input commands i and the corresponding measured printed gray levels for the patches printed by the first printer, and $R_2(i)$ characterizes a relationship between the gray level input commands i and the corresponding measured printed gray levels for the patches printed by the second printer; and
   the step of determining a transform between the grayscale printing characteristics of the first printer and the grayscale printing characteristics of the second printer comprises the step of deriving a transform $I(i)=R_1^{-1}[(R_2(i)]$ where $R_1^{-1}$ denotes the inverse of the function $R_1$.

4. The method of claim 3 wherein the step of measuring the printed gray level of the printed patches comprises the step of measuring the density of the printed patches.

5. The method of claim 3, wherein the step of measuring the printed gray level of the printed patches comprises the step of measuring the reflectivity of the printed patches.

6. The method of claim 3, wherein the step of determining $R_1(i)$ and $R_2(i)$ comprises the step of curve fitting the measured printed gray level measurements.

7. The method of claim 6, wherein the step of curve fitting comprises the steps of:
   dividing the gray level input commands i into a plurality of segments; and
   curve fitting the measured printed gray level measurements for each segment.

8. The method of claim 7, wherein the measured printed gray level measurements are curve fitted in accordance with a linear least squares algorithm.

9. The method of claim 8, wherein the measured printed gray level measurements are curve fitted with a power least squares fit.

10. An apparatus for configuring a first printer to simulate grayscale printing characteristics of a second printer, comprising:
    means for characterizing the grayscale printing characteristics of the first printer and the second printer; and
    means for determining a transform between the grayscale printing characteristics of the first printer and the grayscale printing characteristics of the second printer, the transform for modifying first printer grayscale commands so as to effect the grayscale printing characteristics of the second printing.

11. The apparatus of claim 10, further comprising means for storing the transform between the grayscale printing characteristics of the first printer and the grayscale printing characteristics of the second printer as a look up table.

12. The apparatus of claim 10, wherein:
    the means for characterizing the grayscale printing characteristics of the first printer and the second printer comprises:
    means for printing patches of gray levels with the first printer and the second printer, each gray level patch corresponding to a gray level input command i;
    means for measuring the printed gray level of the printed patches;
    means for determining a function normalized $R_1(i)$ and a normalized function $R_2(i)$ such that $R_1(i)$ characterizes a relationship between the gray level input commands i and the corresponding measured printed gray levels for the patches printed by the first printer, and $R_2(i)$ characterizes a relationship between the gray level input commands i and the corresponding measured printed gray levels for the patches printed by the second printer; and the means for determining a transform between the grayscale printing characteristics of the first printer and the grayscale printing characteristics of the second printer comprises a means for deriving a transform $I(i)=R_1^{-1}[(R_2(i)]$ where $R_1^{-1}$ denotes the inverse of the function $R_1$.

13. The apparatus of claim 12 wherein the means for measuring the printed gray level of the printed patches comprises means for measuring the density of the printed patches.

14. The apparatus of claim 12 wherein the means for measuring the printed gray level of the printed patches comprises means for measuring the reflectivity of the printed patches.

15. The apparatus of claim 12, wherein the means for determining $R_1(i)$ and $R_2(i)$ comprises means for curve fitting the measured printed gray level measurements.

16. The apparatus of claim 12, wherein the means for curve fitting comprises:

means for dividing the gray level input commands i into a plurality of segments; and means for curve fitting the measured printed gray level measurements for each segment.

17. The apparatus of claim 16, wherein the measured printed gray level measurements are curve fitted in accordance with a linear least squares algorithm.

18. The apparatus of claim 16, wherein the measured printed gray level measurements are curve fitted with a power least squares fit.

19. A memory for storing data usable to configure a first printer to simulate grayscale printing characteristics of a second printer, wherein the data is generated by performing the steps of:

characterizing the grayscale printing characteristics of the first printer and the second printer; and determining a transform between the grayscale printing characteristics of the first printer and the grayscale printing characteristics of the second printer using the characterized grayscale printing characteristics of the first printer and the second printer, the transform for modifying first printer grayscale commands so as to effect the grayscale printing characteristics of the second printer.

20. A method of rendering image data, comprising the steps of:

receiving a grayscale command in a first halftoning device;

applying a transform to the grayscale command to modify the grayscale command so as to emulate a grayscale characteristic of a second halftoning device; and providing the modified grayscale command to the first halftoning device.

21. The method of claim 20, wherein the transform is derived by performing the steps of:

determining a normalized function $R_1(i)$ and a normalized function $R_2(i)$ such that $R_1(i)$ characterizes a relationship between a gray level input command i and a corresponding measured gray level rendered by the first halftoning device, and $R_2(i)$ characterizes a relationship between the gray level input command i and a corresponding measured gray level rendered by the second halftoning device; and deriving the transform $I(i)=R_1^{-1}[R_2(i)]$, where $R_1^{-1}$ denotes the inverse of the function $R_1$.

22. The method of claim 21, wherein the step of determining $R_1(i)$ and $R_2(i)$ comprises the step of curve-fitting a plurality of measured gray levels.

23. The method of claim 3 wherein the measured gray levels are curve-fitted in accordance with a power least squares fit.

24. The method of claim 22, wherein the measured gray levels are curve-fitted in accordance with a linear least-squares algorithm.

25. The method of claim 22, wherein the step of curve fitting comprises the steps of:

dividing the gray level input commands i into a plurality of segments; and curve-fitting the measured gray level measurements for each segment.

26. An apparatus for rendering image data, comprising:

means for receiving a grayscale command in a first halftoning device;

means for applying a transform to the grayscale command to modify the grayscale command so as to emulate a grayscale characteristic of a second halftoning device; and means for providing the modified grayscale command to the first halftoning device.

27. The apparatus of claim 26, wherein the transform is derived by performing the steps of:

determining a normalized function $R_1(i)$ and a normalized function $R_2(i)$ such that $R_1(i)$ characterizes a relationship between a gray level input command i and a corresponding measured gray level rendered by the first halftoning device, and $R_2(i)$ characterizes a relationship between the gray level input command i and a corresponding measured gray level rendered by the second halftoning device; and deriving the transform $I(i)=R_1^{-1}[R_2(i)]$, where $R_1^{-1}$ denotes the inverse of the function $R_1$.

28. The apparatus of claim 27, wherein the step of determining $R_1(i)$ and $R_2(i)$ comprises the step of curve-fitting a plurality of measured gray levels.

29. The apparatus of claim 28, wherein the measured gray levels are curve-fitted in accordance with a power least squares fit.

30. The apparatus of claim 28, wherein the measured gray levels are curve-fitted in accordance with a linear least-squares algorithm.

31. The apparatus of claim 28, wherein the step of curve fitting comprises the steps of:

dividing the gray level input commands i into a plurality of segments; and curve-fitting the measured gray level measurements for each segment.

32. A program storage device, readable by computer, tangibly embodying one or more programs of instructions executable by the computer to perform method steps of rendering image data, the method comprising the steps of:

receiving a grayscale command in a first halftoning device;

applying a transform to the grayscale command to modify the grayscale command so as to emulate a grayscale characteristic of a second halftoning device; and providing the modified grayscale command to the first halftoning device.

33. The program storage device of claim 32, wherein the transform is derived by performing the steps of:

determining a normalized function $R_1(i)$ and a normalized function $R_2(i)$ such that $R_1(i)$ characterizes a relationship between a gray level input command i and a corresponding measured gray level rendered by the first halftoning device, and $R_2(i)$ characterizes a relationship between the gray level input command i and a corresponding measured gray level rendered by the second halftoning device; and deriving the transform $I(i)=R_1^{-1}[R_2(i)]$, where $R_1^{-1}$ denotes the inverse of the function $R_1$.

34. The program storage device of claim 33, wherein $R_1(i)$ and $R_2(i)$ are determined by curve-fitting a plurality of measured gray levels.

35. The program storage device of claim 34, wherein the measured gray levels are curve-fitted in accordance with a power least squares fit.

36. The program storage device of claim 34, wherein the measured gray levels are curve-fitted in accordance with a linear least-squares algorithm.

37. The program storage device of claim 34, wherein the step of curve fitting comprises the steps of:

dividing the gray level input commands i into a plurality of segments; and curve-fitting the measured gray level measurements for each segment.

* * * * *